United States Patent [19]

Kuwata et al.

[11] Patent Number: 5,309,015

[45] Date of Patent: May 3, 1994

[54] CLOCK WIRING AND SEMICONDUCTOR INTEGRATED CIRCUIT DEVICE HAVING THE SAME

[75] Inventors: Makoto Kuwata, Ohme; Nobuaki Kitamura, Iruma, both of Japan

[73] Assignees: Hitachi, Ltd.; Hitachi VLSI Engineering Corp., Tokyo, Japan

[21] Appl. No.: 966,801

[22] Filed: Oct. 26, 1992

[30] Foreign Application Priority Data

Nov. 14, 1991 [JP] Japan .................. 3-298900

[51] Int. Cl.$^5$ ............ H01L 27/10; H01L 27/15; H01L 23/48
[52] U.S. Cl. ..................... 257/659; 257/207; 257/210; 257/211; 257/758; 257/776; 257/664; 307/91
[58] Field of Search ............ 257/207, 210, 211, 659, 257/664, 753, 776; 307/91

[56] References Cited

U.S. PATENT DOCUMENTS

| | | | |
|---|---|---|---|
| 4,514,749 | 4/1985 | Shoji | 257/659 |
| 4,958,222 | 9/1990 | Takakura et al. | 257/659 |
| 5,160,997 | 11/1992 | Sandoh et al. | 257/659 |

FOREIGN PATENT DOCUMENTS

| | | | |
|---|---|---|---|
| 59-144171 | 8/1984 | Japan | 257/659 |
| 3-224261 | 10/1991 | Japan | 257/651 |

OTHER PUBLICATIONS

Yamagishi, Mikio, et al. "A Two-Chip CMOS 64b Mainframe Processor Chipset," IEEE 1991 Custom Integrated Circuits Conference, pp. 15.4.1 through 15.4.4. (Provided in English).

Primary Examiner—Ngan Ngo
Attorney, Agent, or Firm—Fay, Sharpe, Beall, Fagan, Minnich & McKee

[57] ABSTRACT

In a clock wiring of a semiconductor integrated circuit device or a printed wiring, a shield clock wiring to be connected with the same drive source as a drive source to be connected with the clock wiring is laid adjacent to the whole or partial length of the clock wiring.

10 Claims, 5 Drawing Sheets

CLOCK WIRING AND SEMICONDUCTOR INTEGRATED CIRCUIT DEVICE HAVING THE SAME

BACKGROUND OF THE INVENTION

The present invention relates to a technology which is especially effective if applied to a clock wiring and, more particularly, to a technology which is effective if used in a clock wiring of a semiconductor integrated circuit device such as a large scale integration semiconductor integrated circuit such as a processor having a number of functions, or a printed wiring.

In a semiconductor integrated circuit device, especially either a large scale integrated circuit such as a processor having a number of functions or a large scale integrated circuit (as will be shortly referred to as "LSI") capable of operating at a high speed, a number of flip-flops (as will be shortly referred to as "FF") have to be synchronously operated. At this time, in order to operate the circuit at a high speed, the rise/fall time of a clock has to be shortened to reduce the skew between the FFs. For this reduction, it is necessary to reduce the capacity of a clock wiring and to equalize the impedances, i.e., the resistances and capacities of the individual lines of the clock wiring.

In order to solve this problem, there is a disclosure in 15.4.1 to 15.4.4 of IEEE 1991 CUSTOM INTEGRATED CIRCUITS CONFERENCE.

SUMMARY OF THE INVENTION

The above-specified prior art contemplates to equalize the impedances of the individual clock wiring lines by equalizing their lengths. However, the individual clock wiring lines are given different capacities since a signal wiring or a power wiring is present around the clock wiring. Thus, our investigations have revealed that the impedances of the individual clock wiring lines can be hardly equalized merely by equalizing their lengths.

In a synchronous circuit using a PLL or the like, on the other hand, it is desired to minimize the capacity of the clock wiring.

An object of the present invention is to provide a technology for reducing the delay time and rise/fall time of a clock thereby to reduce the skew between the FFs in a clock wiring to be applied a semiconductor integrated circuit device or a printed wiring.

The aforementioned and other objects and novel features of the present invention will become apparent from the following description to be made with reference to the accompanying drawings.

A representative of the invention to be disclosed herein will be briefly described in the following. In a clock wiring of a semiconductor integrated circuit device or a printed wiring, a shield clock wiring to be connected with the same drive source as a drive source to be connected with the clock wiring is laid adjacent to the whole or partial length of the clock wiring.

According to the above-specified means, the clock wiring can have its capacity reduced. At the same time, the value of the capacity can be adjusted so that the impedances of the individual clock wiring lines can be equalized by equalizing their capacities. This makes it possible to reduce the delay time and rise/fall time of a clock between the clock wiring lines thereby to reduce the skew between the individual FFs.

DESCRIPTION OF THE PREFERRED EMBODIMENTS

Figure 1:
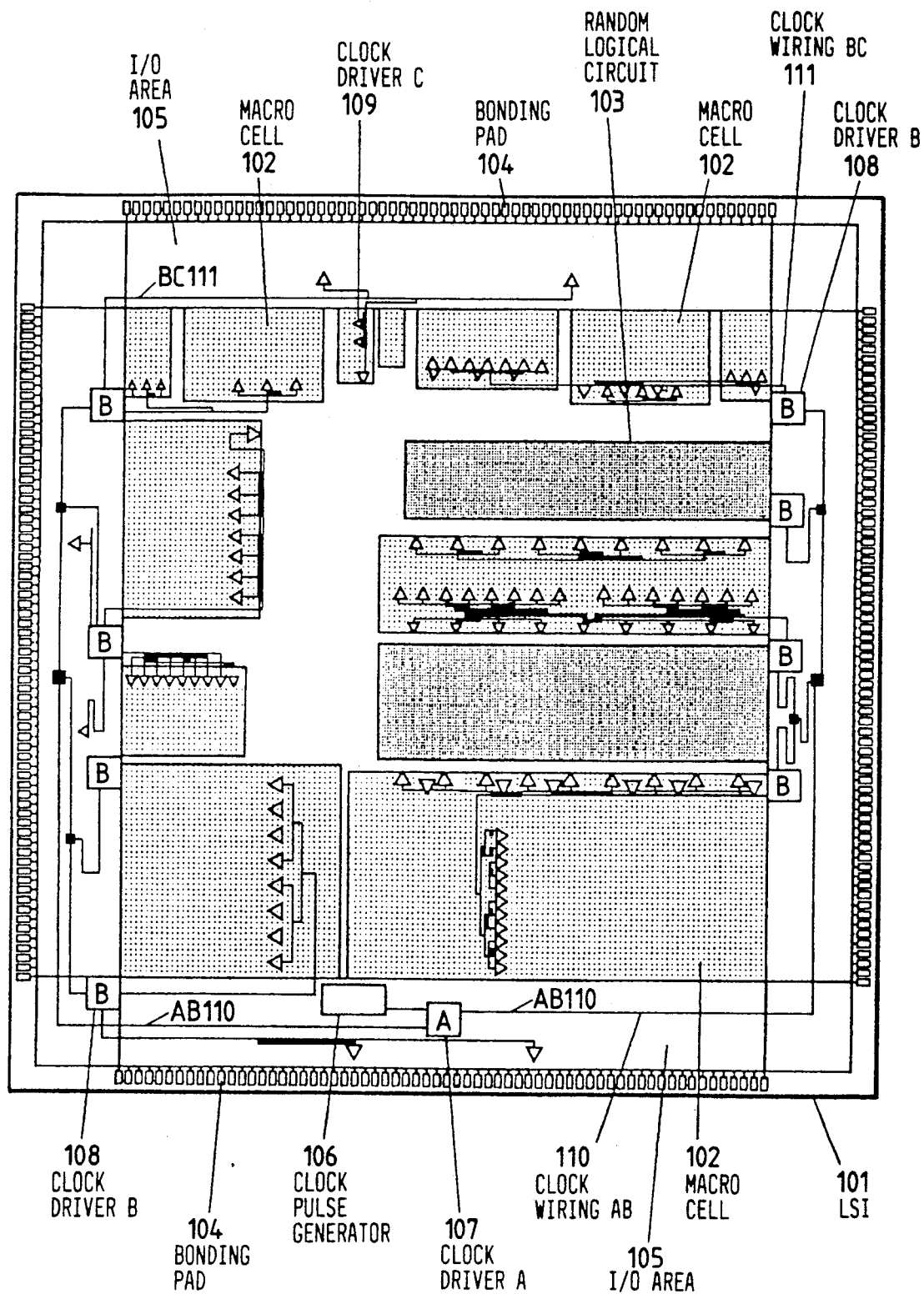
FIG. 1 is a top plan view showing an LSI to which a clock wiring of the present invention is applied.

First of all, an LSI, to which a clock wiring is applied, and a system of the clock wiring will be described with reference to FIGS. 1 and 2. FIG. 1 presents a top plan view of the LSI, and FIG. 2 is a clock diagram.

In FIG. 1, an LSI 101 is constructed to include macro cells 102 having logical function and a random logical circuit 103. A transfer of signals between the LSI 101 and the outside is carried out through bonding pads 104 and an I/O area 105.

A clock to be fed to the macro cell 102 or the random logical circuit 103 is transferred in the following manner. The clock is inputted from the outside through the bonding pad 104 and the I/O area 105 and has its waveform shaped by a clock pulse generator 106 until it is inputted to a clock driver A 107. The clock outputted from the clock driver A 107 is inputted through a clock wiring AB 110 to several or ten and several clock drivers B 108. The clock outputted from the clock driver B 108 is inputted through a clock wiring BC 111 and several to ten and several clock drivers C 109. Those clock drivers A 110 and B 108 are placed just below or in the vicinity of a power line since they may become sources of noise.

Figure 2:
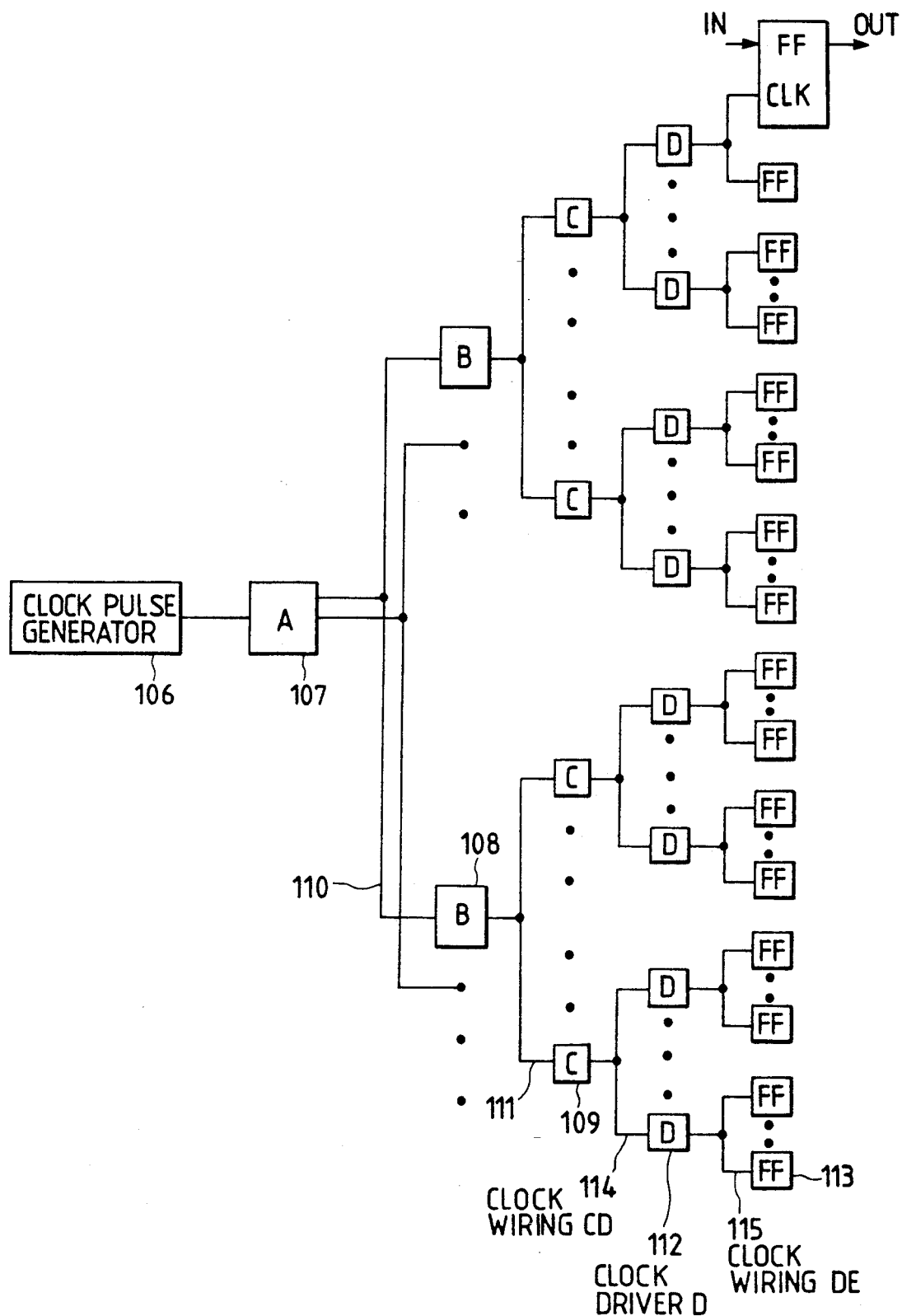
FIG. 2 is a clock diagram of the present invention.

Moreover, the clock outputted from the aforementioned clock driver C 109 is inputted, as shown in FIG. 2, through a clock wiring CD 114 to a several to ten and several clock drivers D 112. The clock outputted from the clock driver D 112 is inputted through a clock wiring DE 115 to the clock terminals CLK of several to ten and several FFs 113. Incidentally, the clock terminal CLK of the FF is shown only for the uppermost FF in FIG. 2, but all the lower FFs likewise have their clock terminals CLK.

The shield clock wiring of the present invention can be applied to all or a portion of the clock wiring AB 110, clock wiring BC 111, clock wiring CD 114 and clock wiring DE 115 thus far described. The shield clock wiring can be applied to only the clock wiring AB 110, for example.

Figure 3:
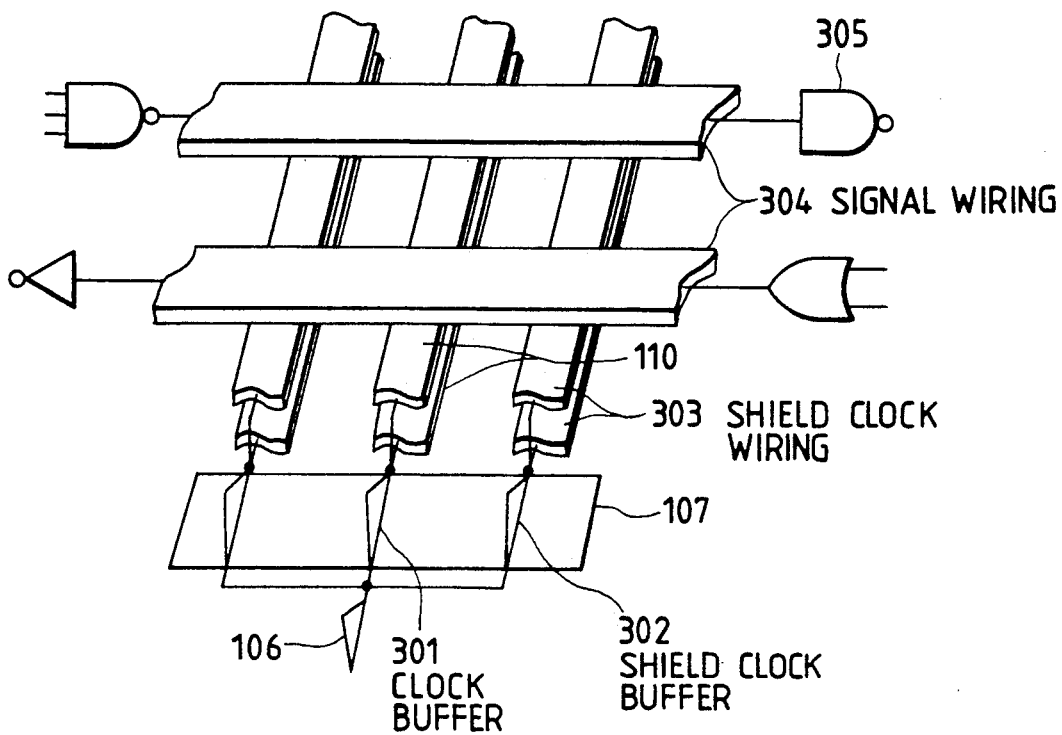
FIG. 3 is a perspective view showing a first embodiment of a clock wiring structure of the present invention.
Figure 4:
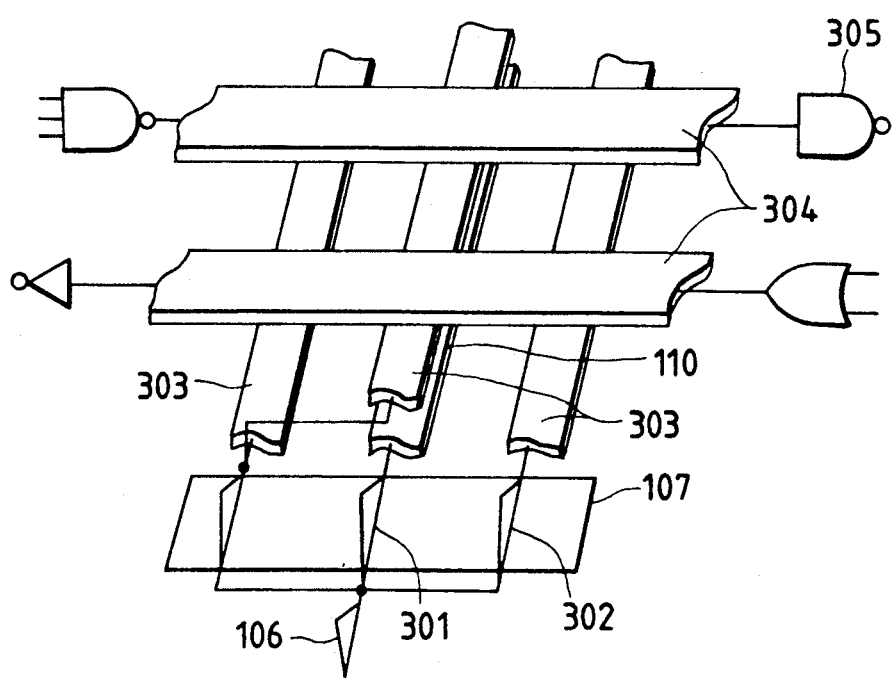
FIG. 4 is a perspective view showing a second embodiment of a clock wiring structure of the present invention.

Next, a specific structure of the clock wiring will be described with reference to FIGS. 3 and 4. FIGS. 3 and 4 are perspective views showing embodiments of different structures, in which the present invention is applied to the clock wiring AB 110.

The numeral 110 appearing in FIG. 3 designates the clock wiring AB, and shield clock wiring 303 is laid adjacent to the righthand and lefthand sides of the clock wiring AB 110. Here, both the clock wiring AB 110 and the shield clock wiring 303 have their line resistances reduced by connecting two upper and lower conductors in parallel.

A clock outputted from the pulse generator 106 acting as a drive source for driving the clock wiring AB 110 is inputted through the clock driver A 107 to the clock wiring AB 110 and the shield clock wiring 303. The clock driver A 107 is constructed to include a clock buffer 301 for driving the clock wiring AB 110 and a shield clock buffer 302 for driving the shield clock wiring 303. Here, the individual buffers 301 and 302 are provided for isolating the individual wiring lines electrically and for equalizing the skews of the FFs. If the design should allow, direct connections not through any buffer could be achieved. Incidentally, reference numeral 304 appearing in FIG. 4 designates a signal wiring which intersect the clock wiring and which is connected with a gate 305 or the like.

According to the structure thus far described, the clock wiring AB 110 is shielded by the shield clock wiring 303 to reduce its capacity with a power line or signal line (although not shown) connected adjacent to and in parallel with the clock wiring AB 110. On the other hand, a capacity is newly established between the clock wiring AB 110 and the shield clock wiring 303. However, the clock wiring AB 110 and the shield clock wiring 303 are fed with clocks in phase by the clock pulse generator 106 so that the clock signals of the two wiring lines operate at substantially equal rise/fall times to cancel the aforementioned newly established capacity. As a result, the capacity, as viewed from the clock buffer 301 is reduced to reduce the delay time of the buffer and the delay in the wiring resistance. In all the clock wiring lines AB 110 provided with the shield clock wiring lines 303, moreover, the value of the capacity, as viewed from the clock wiring AB 110 can be fixed by the shield clock wiring 303 to reduce the dispersions in the delay between the individual clock wiring lines and in the rise/fall times.

Moreover, the delay dispersion and the rise/fall time delay can be further reduced by equalizing the lengths of the clock wiring lines AB 110 of the present embodiment. In this embodiment of the wiring lines of equal length, all the clock wiring lines AB 110 are arranged to have an equal length, as shown in FIG. 1. The clock wiring lines BC 111 are also equalized in length, although not shown in detail.

FIG. 3 shows the embodiment, in which the shield clock wiring lines are laid at the two sides of the clock wiring. In case, however, the signal lines and the power lines are present over and below the clock wiring, the shield clock wiring lines are laid over and below the same. FIG. 4 shows the embodiment, in which the shield clock wiring line 303 is arranged between the upper signal wiring lines 304 in addition to the righthand and lefthand shield clock wiring lines 303 since the signal wiring 304 runs over the clock wiring AB 110. Thus, the shield clock wiring lines can be laid over and/or below and/or at the righthand and/or lefthand of the clock wiring AB 110.

Here is omitted a specific structure of the shield clock wiring but will be described another embodiment.

The shield clock wiring need not be laid for the whole length of the clock wiring line, but a predetermined effect could be obtained if the shield clock wiring is arranged in a partial region.

Moreover, the shield clock wiring need not be always formed for the signal wiring or power wiring. Even if another signal wiring 304 or power wiring (although not shown) runs thereabove or therebelow, as shown in FIG. 3, the shield clock wiring between the clock wiring AB 110 and the signal wiring 304 can be omitted if the capacity inbetween is low within an allowable range.

Still moreover, the shield clock wiring in other directions can be omitted by laying it only in a direction to cause the shielding effect.

In case clock wiring lines of multiple phases are to be arrayed in parallel, the shield clock wiring lines of the present invention may be laid in different phases. In this case, the capacity of the shield clock wiring can be reduced by making the gap between the shield clock wiring lines in different phases wider than that between the clock wiring and the shield clock wiring. Incidentally, the gap between the individual wiring lines can be not only effective for the clock wiring lines of multiple phases but also applied to other portions. For example, the external capacity of the shield clock wiring can be reduced, for example, by making the gap between the shield clock wiring and either the signal line adjacent thereto or the power wiring wider than that between the clock wiring and the shield clock wiring.

Figure 5:
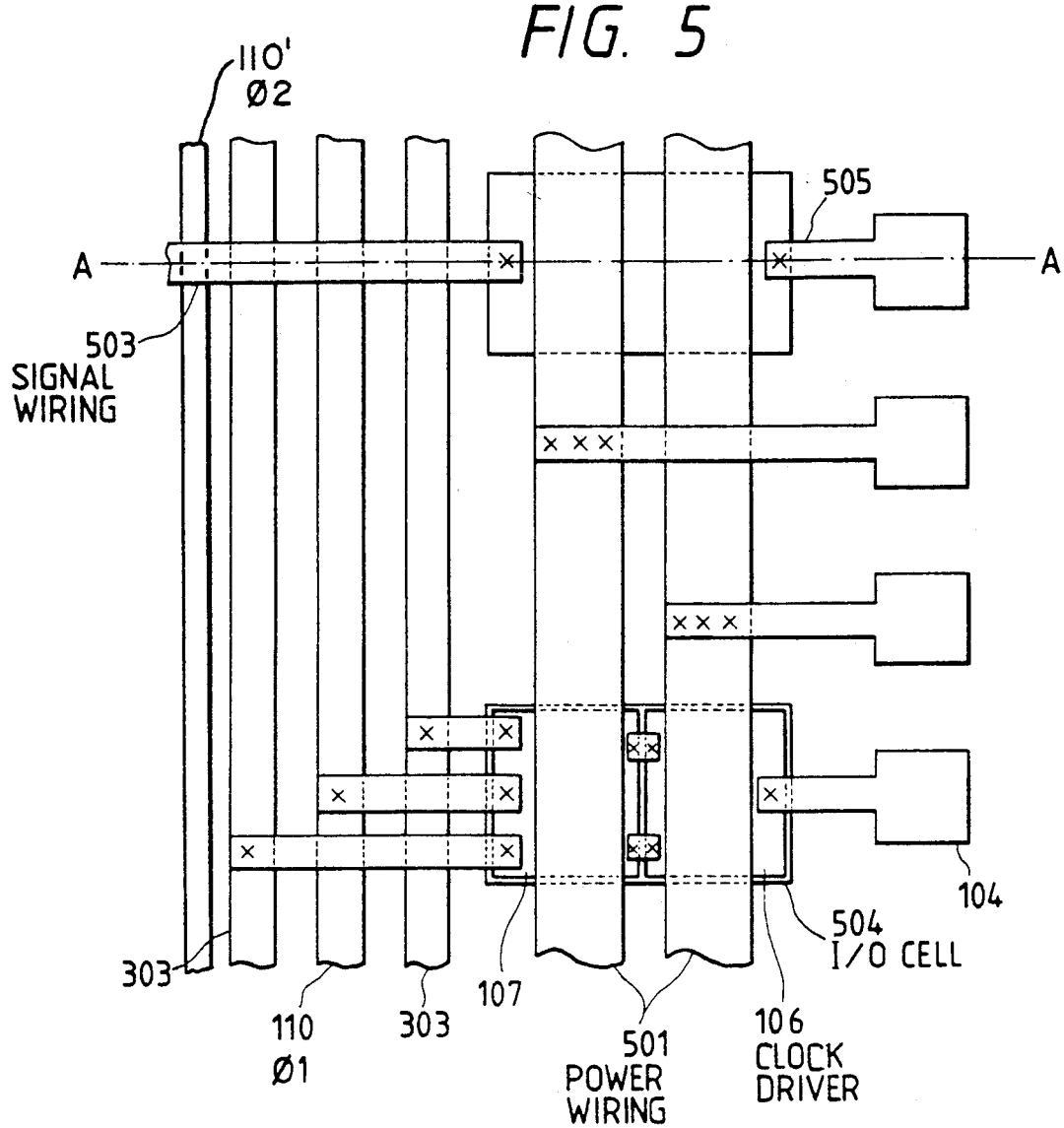
FIG. 5 is a top plan view showing a relation between a clock wiring and a power wiring of the present invention.
Figure 6:
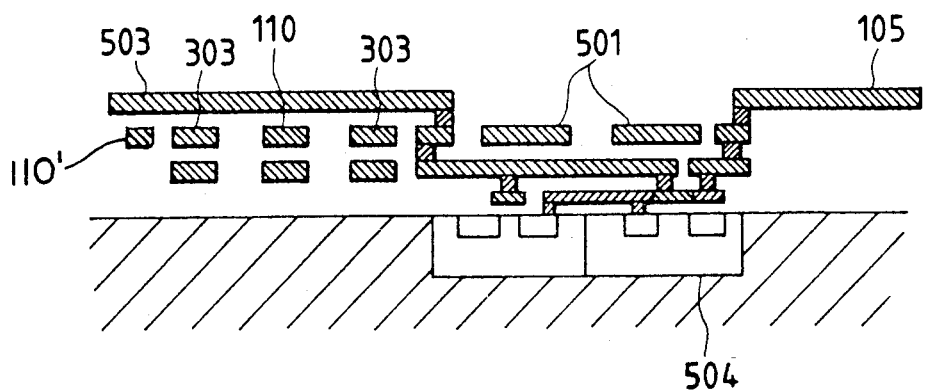
FIG. 6 is a section taken from FIG. 5.

Next, one embodiment between the clock wiring and the power wiring will be described with reference to FIGS. 5 and 6. FIG. 5 is a top plan view showing a portion of the present embodiment, and FIG. 6 is a section taken along line A—A of FIG. 5. These two Figures show the positional relations between the individual wiring lines conceptionally but not schematically. For example, a component such as an insulating layer having no direct relation to the description of the wiring structure is not shown. Moreover, an I/O cell 504 is energized as a matter of fact by a power wiring 501, but their connection is not shown.

In the present embodiment, the clock wiring AB 110 (carrying a $\Phi 1$ clock signal) and the shield clock wiring 303 are laid adjacent to the I/O cell 504. A signal wiring 503 for connecting the I/O cell 504 and the inside of the LSI runs over the clock wiring AB 110 and the shield clock wiring 303. In the present embodiment, the clock wiring AB 110 can have its capacity easily reduced and can be easily arranged partly because the clock wiring AB 110 and the shield clock wiring 303 are present adjacent to the power wiring 501 and partly because the number of crossing signal wiring lines 503 is small.

Also illustrated in FIG. 5 is a second $\Phi 2$ clock signal in clock wiring 110', otherwise the same as that 110.

Moreover, the present invention is exemplified by arranging the clock driver 106 just below the power line 501, i.e., the power ring and by forming the clock wiring AB 110 and the shield clock wiring 303 over a common layer.

Incidentally, the shield clock wiring 303 adjacent to the power wiring 501 can be omitted although the capacity of the clock wiring AB 110 is increased more or less. This is because the power wiring 501 has not a fluctuating potential as the signal wiring but a fixed potential so that the dispersion in the capacity between the clock wiring AB 110 and the power wiring 501 is reduced. Thus, the dispersion in the capacity can be reduced not by laying the shield clock wiring newly but by using the power wiring 501 as a shield.

Figure 7:
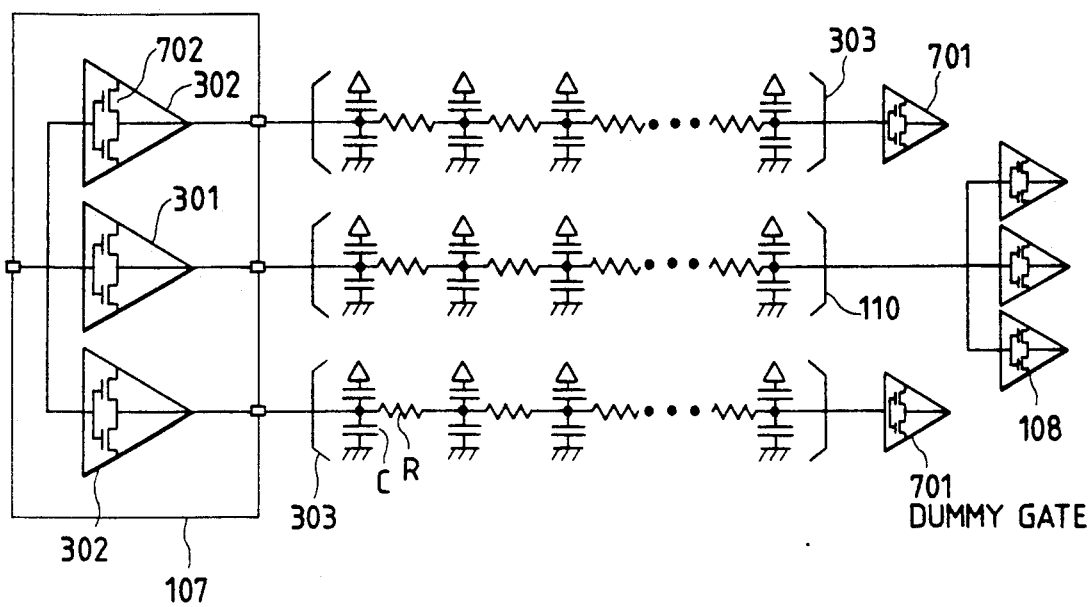
FIG. 7 is a circuit diagram showing an equivalent circuit showing the clock wiring of the present invention.

An equivalent of the clock wiring of the present invention thus far described is shown in FIG. 7. In FIG. 7, the clock wiring AB 110 and the shield clock wiring 303 are illustrated in a distribution constant of a resistor R and a capacitor C. The capacitor C, as expressed here, contains a capacity or the like, which is owned by a signal wiring running across or in parallel with the clock wiring AB 110 and the shield clock wiring 303. The clock buffer 301 drives the clock driver B 108 through the clock wiring AB 110.

Figure 8:
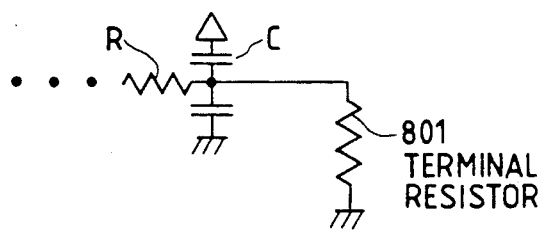
FIG. 8 is a circuit diagram showing a modification of a dummy gate of FIG. 7.

A dummy gate 701 for summing the capacities, as shown in FIG. 7, may be connected with the terminal or midway of the shield clock wiring 303 which is connected with the shield clock buffer 302. In place of the dummy gate 701, a terminal resistor 801 may be connected, as shown in FIG. 8. Moreover, a capacitor, a diode, a transistor and so on may be added, although not shown. If unnecessary, the circuit may be opened without adding those elements.

Figure 9:
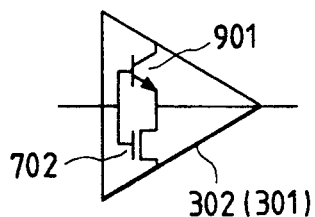
FIG. 9 is a circuit diagram showing a modification of a buffer of FIG. 7.

Furthermore, the type of the buffers 301 and 302 in the clock driver A 107 should not be limited to the use of a MOS transistor 702, as shown in FIG. 7, but the circuit may include a bipolar transistor or a combination of the MOS transistor 702 and a bipolar transistor 901, as shown in FIG. 9.

At this time, the rise/fall times of the clock may be equivalently accelerated, if necessary, by changing the circuit type of the shield clock buffer 302 or by making the driving force stronger than that of the clock buffer 301. Alternatively, the rise/fall times of the clock may be equivalently accelerated by adding an additional function to the clock driver or inserting a delay element to delay the clock buffer relative to the shield clock buffer thereby to shift the phase.

Although our invention has been specifically described in connection with the embodiments thereof, it should not be limited to the aforementioned embodiments but can naturally be modified in various manners without departing from the gist thereof.

Moreover, although our invention has been described hereinbefore mainly in case it is applied to the clock wiring of the LSI backgrounding the field of application thereof, it should not be applied to the application. For example, the present invention can be applied to a semiconductor integrated circuit device or printed wiring other than the LSI so that it can be widely applied to a technology using the clock wiring.

As has been described hereinbefore, according to the present invention, the shield clock wiring is laid wholly or partially of the surrounding of the clock wiring to make the clock wiring and the shield clock wiring substantially in phase so that the capacity of the clock wiring can be reduced. Moreover, the capacities between the individual clock wiring lines are equalized to reduce the delay time and rise/fall times of the clock so that the clock skew can be reduced. Thus, the present invention is highly effective in quickly operating the circuit which is constructed over the LSI or the printed board.

What is claimed is:

1. A semiconductor integrated circuit device comprising:
   a clock wiring;
   a shield clock wiring;
   a first clock driver connected with said clock wiring;
   a second clock driver connected with said shield clock wiring; and
   a clock pulse generator for feeding a clock signal to said first clock driver and said second clock driver, wherein said clock wiring is arrayed close to said shield clock wiring in its whole or partial length.

2. A semiconductor integrated circuit device according to claim 1, wherein said first clock driver is arranged just below or in the vicinity of a power wiring.

3. A semiconductor integrated circuit device according to claim 2, wherein said clock wiring has said shield clock wiring laid adjacent to itself.

4. A semiconductor integrated circuit device according to claim 3, wherein said clock wiring has said shield clock wiring laid at its righthand and/or lefthand side.

5. A semiconductor integrated circuit device according to claim 4, wherein said shield clock wiring is wider between adjacent lines through which different clock phases are communicated, than between said shield clock wiring and said clock wiring.

6. A semiconductor integrated circuit device according to claim 5, wherein said shield clock wiring is arrayed between the adjacent lines of different phases of said clock wiring.

7. A semiconductor integrated circuit device according to claim 6, wherein said semiconductor integrated circuit device is formed from a plurality of layers, and wherein said clock wiring and said shield clock wiring are formed in a common layer of said plurality of layers.

8. A semiconductor integrated circuit device according to claim 7, wherein said shield clock wiring has its terminal connected with a passive element or an active element.

9. A semiconductor integrated circuit device according to claim 8, wherein said second clock driver has a higher power output capacity than that of said first clock driver.

10. A semiconductor integrated circuit device according to claim 9, wherein a clock signal to be inputted to said shield clock wiring is shifted in phase from a clock signal to be inputted to said clock wiring.

* * * * *